United States Patent [19]

Drenner

[11] Patent Number: 5,254,252
[45] Date of Patent: Oct. 19, 1993

[54] ECOLOGICAL TREATMENT SYSTEM FOR FLOWING WATER

[76] Inventor: Ray W. Drenner, 2534 Boyd, Fort Worth, Tex. 76109

[21] Appl. No.: 954,259

[22] Filed: Sep. 29, 1992

[51] Int. Cl.$^5$ .............................................. C02F 3/32
[52] U.S. Cl. .................................. 210/602; 210/747; 210/150; 210/170; 47/1.4
[58] Field of Search ................... 210/602, 615–617, 210/150, 151, 747, 170; 47/1.4

[56] References Cited

U.S. PATENT DOCUMENTS

| 3,348,285 | 9/1982 | Groeneweg et al. | 210/602 |
|---|---|---|---|
| 3,444,647 | 5/1969 | Takahashi | 47/1.4 |
| 3,635,816 | 1/1972 | Golub | 210/2 |
| 3,768,200 | 10/1973 | Klock | 47/1.4 |
| 3,780,471 | 12/1973 | Ort | 47/1.4 |
| 3,839,198 | 10/1974 | Shelef | 210/14 |
| 4,005,546 | 2/1977 | Oswald | 47/1.4 |
| 4,169,050 | 9/1979 | Serfling et al. | 210/12 |
| 4,209,388 | 6/1980 | DeFraites | 210/8 |
| 4,267,038 | 5/1981 | Thompson | 210/602 |
| 4,333,263 | 6/1982 | Adey | 47/1.4 |
| 4,432,869 | 2/1984 | Groeneweg et al. | 210/602 |
| 4,695,384 | 9/1987 | Ripl et al. | 210/602 |
| 4,727,672 | 3/1988 | Hill et al. | 43/4 |
| 4,910,912 | 3/1990 | Lowrey | 47/62 |
| 5,011,604 | 4/1991 | Wilde et al. | 210/602 |
| 5,040,486 | 8/1991 | Pack | 119/3 |

OTHER PUBLICATIONS

Vymazal, I. 1988. "The Use of Periphyton Communities for Nutrient Removal from Polluted Streams", Hydrobiologia 166: 225–237.

Mulholland, P. J. et al. 1991. "Role of Nutrient Cycling and Herbivory in Regulating Periphyton Communities in Laboratory Streams". Ecology 72: 966–982.

Primary Examiner—Thomas Wyse
Attorney, Agent, or Firm—Charles D. Gunter, Jr.; Susan L. Firestone

[57] ABSTRACT

The invention is a method for using periphyton to treat flowing water in a waterway. The periphyton reduces the quantity of undesirable chemicals polluting the water. Fish, in turn, control the density of periphyton by grazing on the periphyton and convert the undesirable chemicals associated with the periphyton into removable forms such as fish tissue or fish feces.

26 Claims, 1 Drawing Sheet

ECOLOGICAL TREATMENT SYSTEM FOR FLOWING WATER

BACKGROUND OF THE INVENTION

Field of the Invention

1. The present invention relates generally to ecologically balanced treatment systems for treating flowing water in order to reduce the quantity of undesirable chemicals found in the water. More specifically, the invention relates to an ecologically balanced treatment system in which flowing water is treated with periphyton in a primary stage and in which algae-grazing fish feed upon the periphyton in a secondary stage. Fish grazing optimizes periphyton growth and incorporates nutrients or toxicants from the periphyton into forms removable from the system.

2. Description of the Prior Art

Freshwater periphyton are organisms whose ecological niche lies within freshwater ecosystems or communities, such as rivers and lakes. Periphyton attach or grow upon surfaces within the water, for example, stems and leaves of rooted and floating plants and rocks. Periphyton communities contain a variety of organisms, including algae, bacteria, viruses and protozoans.

Periphyton algae reside at the bottom of the food chain in freshwater ecosystems. In a food chain, plants such as algae convert the energy of the sun into chemical food energy during photosynthesis. The food energy from the plants passes through the food chain by means of a series of organisms and steps of eating and being eaten. For example in a stream, algae convert sunlight and nutrients to plant materials. Herbivorous fish eat the algae. Carnivorous fish eat the herbivorous fish. Humans catch and eat the carnivorous fish.

Unless broken down, toxicants or toxic substances in the food chain are transferred with every step of consumption. Toxicants often enter the food chain at the lower levels, for instance, the periphyton level. For example, toxicants in the water may attach to algae. When the algae is eaten, the consumer eats the toxicant, too.

Toxicants that are not broken down concentrate in the tissues of the consumer with each transfer step. The effect is cumulative. Low, sometimes undetectable, levels of toxicants in the water accumulate in the consumer's tissues until reaching harmful levels. Harmful levels may be sublethal, yet over time, they contribute to the morbidity and mortality of the organism For example, polychlorinated biphenyl (PCB) compounds are highly toxic chemicals that are not readily degraded in the environment. PCB manufacture was discontinued in 1976 in the United States. PCBs, however, are still found in low concentrations in water communities. PCBs pass through the food chain until consumed by game fish. Game fish caught in these water communities frequently have high concentrations of PCBs in their tissue. Humans who eat the game fish also eat the PCBs. Since humans cannot break down PCBs, the PCBs accumulate in the human body during a lifetime. Measurable levels of PCBs are even found in the breast milk of nursing mothers, passing the PCBs to their offspring.

Water quality deteriorates in freshwater ecosystems with elevated levels of nutrients such as nitrogen and phosphorus. Materials rich in nitrogen and phosphorus, such as fertilizer and manure from agricultural run-off, pollute freshwater ecosystems. Excess nitrogen and phosphorus cause excessive phytoplankton growth or "blooms" in freshwater. For example, nitrogen and phosphorus pollution promotes the increase in cyanobacteria or blue-green algae. Cyanobacteria are a bane to potable water production Cyanobacteria add bad tasting and sometimes toxic excretions or decay products to the water. Phytoplankton blooms, especially those with cyanobacteria, cause a decline in water clarity and palatability. Water drawn from sources with phytoplankton blooms is cloudy, bad tasting and smelly.

In water, nitrogen removal occurs either through the food chain or loss to the atmosphere. Phosphorus removal, in contrast, can only be through the food chain. To withdraw phosphorus from water, organisms incorporate or adsorb phosphorus and transfer it via the food chain. Harvesting the organisms from the water eliminates the phosphorus.

In the freshwater community, periphyton acts as a nutrient sink by taking up both nitrogen and phosphorus, thereby decreasing the nutrients remaining in the water. Periphyton adjusts its population growth and nutrient uptake rates depending on the available nutrient levels. The removal rate of nutrients can be high. For instance, phosphorus removal rates can reach 160 mg $P/M^2/d$, while the rate of nitrogen removal can reach 1900 mg $N/M^2/d$.

In spite of these recognized beneficial effects, a limiting factor in the use of periphyton to treat flowing water systems lies in the fact that periphyton's role as a nutrient sink is limited, to some extent, to early colonization and growth phases. This is due to the fact that optimal nutrient removal by periphyton depends upon maintaining maximal or rapid growth. If periphyton growth becomes too thick, an interior anaerobic layer forms and maximal growth ends. At this stage, the periphyton actually begins to release some nutrients back into the water. Further, the periphyton slough off and wash downstream. These results are counterproductive for the stated objectives of the present invention.

Another problem addressed by the method of the present invention lies in the fact that flowing water communities differ dramatically from the communities of ponds, lakes and lagoons. Traditional water treatment and sewage treatment facilities rely upon one or more such "ponds" as an integral part of the treatment process. Such systems are not well suited for handling large volumes of flowing water. For example, the water current is more of a factor in the maintenance and growth in a flowing water community than in a pond. Periphyton adjusts to current velocity. Periphyton population growth increases with faster current velocity Larger periphyton populations remove more nutrients from the water, a beneficial effect of the increased current velocity. Oxygen is also more available in flowing water communities than in ponds. Both the greater amount of water surface area exposed to the air and the constant water movement increase the amount of available oxygen in the flowing water community. These benefits are not realized or efficiently utilized by traditional water treatment or sewage treatment processes.

Fish play an important role in the freshwater food chain and the transfer of nutrients such as nitrogen and phosphorus. Fish eat organisms from the lower level of the food chain. Fish incorporate the consumed nutrients into fish tissue or pass nutrients through their intestinal tract as incompletely digested algae and bacteria.

Effective water purification has been a problem over the years. The need for water purification is urgent. For example, toxicants work their way through natural food chains, becoming dangerously concentrated in fish or birds. Lakes and rivers suffocate from heavy phytoplankton blooms. Chemicals found within a river poison plants and animals that depend on the water for survival, both in the river and along its edge. The present invention provides a simple and ecologically balanced method for treating large volumes of flowing water to provide cleaner water while removing undesirable chemicals found in the untreated, flowing water.

Other problems addressed by the method of the present invention include presently available sewage treatment processes. Present sewage treatment facilities are designed to remove nutrients from water, not toxicants. Present sewage treatment usually involves treating the sewage in holding ponds or lagoons over a period of time to remove nutrients from the water. Toxicants pass into and through the sewage treatment facility. By the end of treatment when the water is released to the environment, the toxicants may be at harmful levels.

Contemporary sewage treatment facilities often inadequately handle large amounts of water that enter the system quickly. To prevent flooding during heavy rains, sewage treatment facilities often dump raw sewage into the channels, rivers, lakes or oceans thereby polluting the water. The current also carries the raw sewage to other locations. This pollution jeopardizes drinking water supplies and contaminates recreational water areas.

In some locations, water treatment is nonexistent or substandard. People in these areas drink whatever water is available. The available water is often contaminated. Treating water using standard engineering practices is complicated and expensive. Small municipalities or water districts have shrinking financial resources. These governments need inexpensive water treatment. The method of the present invention provides a simple and inexpensive ecological process for treating large volumes of flowing water in order to produce cleaner water for municipalities or water districts.

SUMMARY OF THE INVENTION

The method of the invention reduces the quantity of undesirable chemicals in flowing water in a waterway. Periphyton in the waterway uptake undesirable chemicals from the water, and thereby lessens the amount of undesirable chemicals in the flowing water. Fish check excess periphyton growth and convert nutrients in the periphyton to forms removable from the system. The fish also provide a ready method to monitor the amount of undesirable chemicals in the water.

Preferably, the flowing water is diverted from a primary source into an artificial waterway. In the waterway, the flowing water contacts or passes through an artificial substrate. Periphyton, at least partially attached to an artificial substrate, decreases the amount of undesirable chemicals polluting the flowing water. Fish feed on the periphyton which controls periphyton growth. Fish feeding also incorporates undesirable chemicals and converts the chemicals into forms, such as fish tissue or feces, which are removable from the system. The removable forms can be analyzed for undesirable chemical concentrations. The fish graze either during the entire treatment time or after the treatment is completed. In the latter case, the fish are released into the treatment waterway or else the artificial substrate is removed to a second location stocked with fish. At the second location, the fish graze and clean the artificial substrate.

The periphyton can be any periphyton that grow in the conditions of the waterway. The fish are any type of algae-feeding fish.

Additional objects, features and advantages will be apparent in the written description which follows.

DETAILED DESCRIPTION OF THE INVENTION

Figure 1:
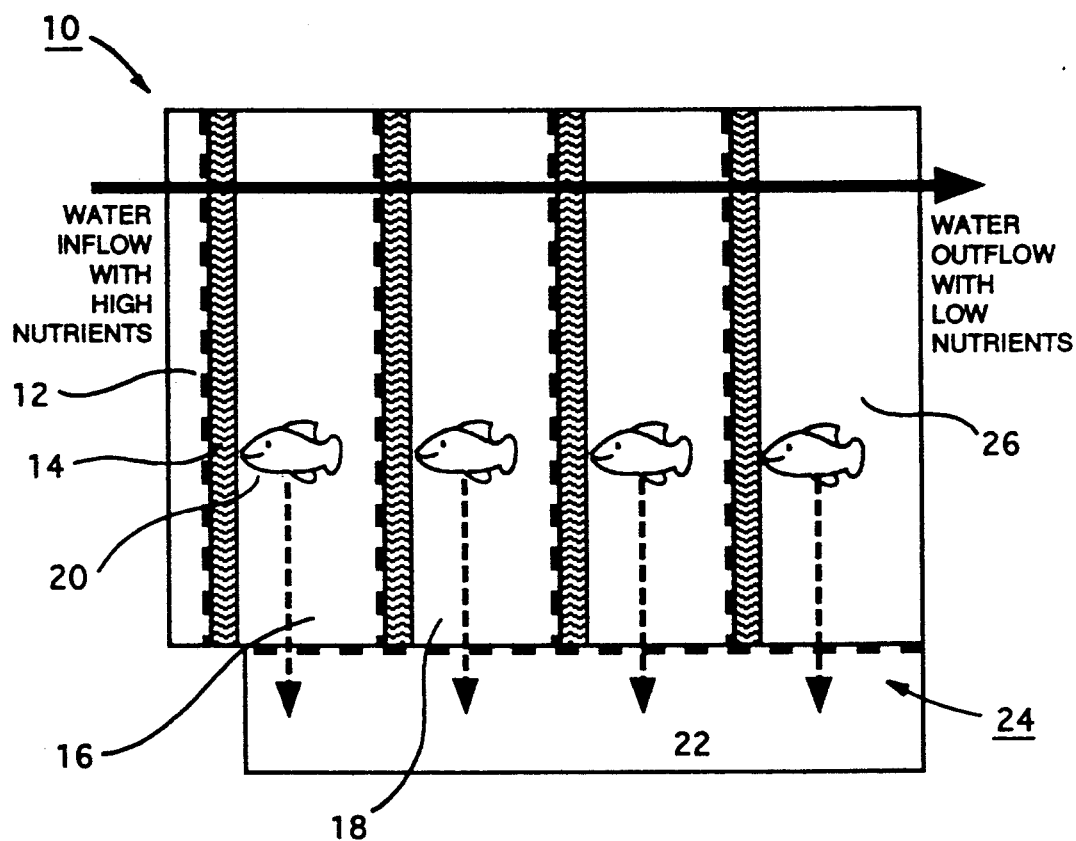
FIG. 1 is a simplified, schematic illustration of one of the methods of the invention.

The method of the invention uses periphyton to reduce the amount of undesirable chemicals or pollutants found in flowing water in a waterway. Since periphyton acts as a nutrient and toxicant sink, it decreases the quantity of undesirable chemicals in the water. Fish control the amount of periphyton through grazing, thereby optimizing periphyton growth. Fish also convert nutrients in the periphyton to forms removable from the system, such as fish tissue and fish feces. The fish, not only provide a ready method to reduce undesirable chemicals, but can also be assayed to monitor the amount of undesirable chemicals in the water during treatment.

In this disclosure, the following terms will be used as follows: "waterway" refers to any means by which water flows or is transported, such as a channel, river, stream, pipe, ditch, canal, tunnel, trough, and the like; "flowing water" refers to running water or lotic systems; "periphyton" refers to the populations of organisms that exist within the periphyton ecological niche, such as algae, bacteria, protozoans and viruses; "undesirable chemicals" refer to any chemicals, whether natural or synthetic, that are not wanted in the water, for example, nitrogen, phosphorus or toxicants; "toxicant" refers to any toxic or harmful substance, such as pesticides, herbicides, industrial by-products, carcinogens, teratogens, and the like; "nutrient" refers to any substance taken up into the food chain, for example, nitrogen or phosphorus.

In the method of the invention, the flowing water can be any freshwater that has unacceptable levels of undesirable chemicals, typically, nitrogen, phosphorus and/or toxicants. The method of the invention treats flowing water and reduces the levels of undesirable chemicals. Generally, the maximum levels of undesirable chemicals allowed in the water depends on the use and location of the treated water. For instance, river and reservoir systems of Texas may have entirely different requirements for maximum levels of undesirable chemicals than lakes or rivers in other parts of the U.S. and the world. The levels of allowable undesirable chemicals may vary as much as one hundred fold. For example, the treatment reduces the levels of nitrogen and phosphorus which exceed the allowed maximum standards for water at a particular location The water treatment also reduces levels of undesirable chemicals, although their concentrations may not exceed current standards. The method of the invention monitors the presence of undesirable chemicals in water, many which are at water concentrations presently undetectable.

The method of the invention treats large volumes of flowing water, such as crop run-off, urban run-off or river water where the volume of water being treated is as much as about 50 million gallons of water per day. Typical treatment volumes range from about 10 to 50 million or more gallons of water per day. The method of the invention treats other undesirable chemicals like nutrients and toxicants that are transferred through the food chain. The method of the invention treats very high levels of nitrogen and phosphorus pollutants, ranging between about 1 to 20 mg/l. Periphyton removes nutrient and toxicants from the water by incorporation or attachment. The periphyton may incorporate the nutrients and toxicants into plant matter or simply attach to the toxicants. When a consumer eats the periphyton, the consumer eats the nutrients or attached toxicant. The flowing water should flow at a minimum rate of about 1 to 10 cm/s for optimal intake of undesirable chemicals by the periphyton. The flow rate, however, should be relatively constant to avoid dislodging periphyton. The flow rate need not be fast if nutrient concentrations are high or the water is mixed as passes through the waterway.

Preferably, the flowing water is diverted from its primary source into a secondary waterway. The primary source can be any pool, lake, reservoir, waterway, sewage lagoon, crop drainage and the like. This secondary waterway can be any waterway that maintains a minimum flow rate of about 1 cm/s and is exposed to either sunlight or artificial sunlight. The minimum flow rate can be maintained by gravity, pumping, or airlifts. Secondary waterways include an individual waterway or a system of waterways, preferably a long trough system. The secondary waterway is preferably formed of concrete, metal, fiberglass, clay filled earthen dikes or levees, or other imperforate material. The flowing water can be further diverted to other, tertiary waterways with similar restrictions.

The waterway may be open to the air or covered. The cover should be glass, plastic or other light transmitting structures, unless using artificial sunlight. In colder climates, it may be crucial to cover the waterway system to prevent a cold weather reduction of periphyton. A cold weather reduction of periphyton could substantially decrease the rate of pollutant removal from the water.

The dimensions of the waterway depend on the conditions of use. The depth of the waterway depends on the source of light. If sunlight is used, the waterway should be no more than 2 m deep or could be as shallow as 10 cm. If artificial sunlight is used, the waterway could be deeper. For example, if a source of artificial sunlight is built into the sides of the troughs, deeper troughs can be used. Waterway width depends on the presence of fish. If fish are present, then waterways wider than 30 cm are preferred.

The periphyton can be any periphyton that survive under the conditions of the waterway habitat. Because periphyton growth increases with current velocity, they are particularly adapted to remove nutrients from large volumes of flowing water. Although periphyton usually establishes itself naturally in the ecosystem, external seeding may be used if desired. The conditions of the waterway should favor the growth of both algae and bacteria.

Preferably, periphyton at least partially attaches to an artificial substrate. The artificial substrate increases the surface area available for periphyton growth and provides a hiding place for fish. This artificial substrate can be anything that periphyton grows on in the waterway and allows water to pass through it, such as a screen, filter, net, filtration screen, and the like. A high surface area to volume ratio is preferred. No surface area to volume ratio for periphyton growth is presently preferred, because the ratio relies on the quantity and type of undesirable chemicals, the dimensions of the waterway, and the turbidity of the flowing water. The artificial substrate should be removable. However, the artificial substrate should be affixed or anchored while within the water to avoid washing downstream. The artificial substrate can be used alone or preferably, in a series. If multiple artificial substrates are used, at least some of the substrates should be spaced more than 25 cm apart to facilitate fish grazing. A series of substrates forms filter cells. The water passes from one filter cell to the next by gravity, pumping or airlifts.

The treatment time depends on both the current and the temperature. Because periphyton growth rates depend on temperature, the system operation time within the waterway varies with temperature. Continuous operation should be possible for one or more months. After treatment, the water flows from the waterway to a receiving point by gravity, pumping or airlifts. The receiving point can be anything that holds water, for instance, waterways, reservoirs, lakes, seas, estuaries, oceans, ponds, tanks, pools, water towers, and the like.

Periphyton should remain in maximal growth for optimal nutrient removal, especially green algae, blue-green algae and nitrogen-fixing bacteria. The minimum current velocity helps maintain the maximal growth phase. The current velocity may maintain the maximal growth phase by assisting the turnover rate of nutrients. The current may be assisted by various mechanical or airlift mixing systems.

Grazing helps preserve maximal growth of periphyton. When fish graze on periphyton, they lessen the amount of periphyton. Fish grazing prevents the periphyton from becoming too thick and subsequently sloughing off the substrate. Sloughing decreases both the number of periphyton available upstream for water treatment and the efficiency of the treatment.

In the method of the invention, fish maintain the periphyton at appropriate levels. Appropriate levels of periphyton keep the treated water compatible with the water at the receiving point. The treated water should be continuously monitored for undesirable chemicals. Monitoring is complex and may focus on different states of the nutrients and toxicants for each type of system and location encountered. For example, phosphorus has several molecular forms. In water, phosphorus is found in a dissolved form, particle-bound forms or a colloidal suspension. The dissolved form of phosphorus may directly incorporate into the periphyton. Particle bound phosphorus is adsorbed on material like clay in the sediment or found within living tissue. For instance, clay-adsorbed phosphorus sticks to many kinds of algae in the periphyton. Fish eat the algae and the clay, thus removing the phosphorus. Therefore, measuring the dissolved and particle-bound phosphorus in the water indicates water quality. Nitrogen has several molecular forms, for instance, dissolved nitrogen gas, ammonia, ammonium salts and various nitrogen compounds. Some fish are sensitive to the ammonia concentration in the water. Therefore, when using ammonia sensitive fish, ammonia levels should be monitored. If the concentrations and forms of undesirable chemicals are incompatible with the receiving point water, the treated water is unacceptable. This may occur when the periphyton are too thick and sloughing occurs.

The fish used in the invention can be any herbivorous or omnivorous type of fish that feeds on periphyton, such as cyprinidae, cichlidae, catostomidae and ictaluridae. The genus and species of fish selected depends on the conditions of the waterway habitat. For example in North Texas, tilapia and stonerollers are preferred. *Tilapia aurea, Tilapia mossambica* and *Campostoma anomalum,* are three possible species for use in North Texas. The fish should be kept at temperatures appropriate for survival. Therefore, tropical fish such as tilapia should be kept at warmer temperatures which may require heating during colder outside temperatures.

The fish may live in the waterway with the periphyton during the treatment or in a separate location, neither living condition is preferable to the other at the present time. In the former case, the fish graze freely while the periphyton reduces the undesirable chemical levels.

In the latter case, the fish stay in a separate location. This location may be another waterway, pond, lake, tank, and the like. After the periphyton becomes too thick, the fish are either brought to the periphyton or the periphyton is brought to the fish. The fish are brought to the periphyton by releasing them into the treatment waterway. For example, fish living in a separate location are released into the treatment trough. Or the periphyton is brought to the fish by removing an artificial substrate with attached periphyton from the treatment waterway and placing the substrate with the fish. For example, removing filters from the treatment waterway and placing them into a pond stocked with fish.

Preferably, the fish convert the undesirable chemicals into a removable form. Fish remove the chemicals from the periphyton in two ways. In the first way, fish incorporate undesirable chemicals, such as nitrogen, phosphorus and toxicants into fish tissue. In the second way, the undesirable chemicals pass through the intestinal tract of the fish as incompletely digested algae and bacteria. Fish and fecal material can be harvested, thus removing the undesirable chemicals from the water.

The fish also serve as "canaries in a coal mine." The fish eat undesirable chemicals in or adsorbed on periphyton. Because of their position in the food chain, the fish incorporate and concentrate the toxicants in their tissues. Fish and the bottom sediment containing fish feces can be removed from the treatment waterway and analyzed. The type and quantity of toxicants found in the analyzed material are excellent indicators of water quality and its potential danger to humans. The fish may also be inspected for signs of tumors and birth defects.

FIG. 1 illustrates one possible configuration of the invention. Water flows into a waterway 10. The inflowing water passes through a porous screen 12 into cell 1 16. The porous screen 12 serves as a substrate for periphyton 14 attachment. The periphyton 14 filter the water and take up the undesirable chemicals from the water. The water next enters cell 2 18 and repeats the process.

Fish 20 in each cell grazes on the periphyton 14, which transfers the undesirable chemicals from the periphyton 14 to the fish 20. The fish 20 either incorporate the undesirable chemicals into the fish's body tissues or egest partially digested undesirable chemicals in feces. The feces fall to the bottom of the waterway 22 where they are can be harvested through a grate 24.

These steps repeat from cell to cell until the water reaches the receiving point 26 and exits the system.

The following examples are given to aid in understanding the invention and are not meant to limit the invention.

EXAMPLE 1

Polluted water with very high concentrations of nitrogen and phosphorus and toxicants is diverted from a river into a long trough system, 2 m deep. The trough contains *Tilapia mossambica* and a series of filter screens spaced at least 25 cm apart. The filter screens have attached periphyton. The water is pumped at a rate of at least 1 cm/s. The fish and sedimented feces are harvested periodically to test for toxicants. When the nutrients and toxicant levels in the water are reduced to acceptable concentrations, the water is released into a canal that flows into a water supply reservoir.

EXAMPLE 2

Polluted water with very high concentrations of nitrogen and phosphorus is diverted from a river into a long trough system, 6 m deep. The trough is made of cement and contains a series of filter screens affixed to the side of the trough and spaced at least 25 cm apart. On the sides spaced every 1 m and at a depth of 4 m is a source of artificial sunlight. The artificial sunlight is on for 14 h/day. The trough's filter screens have attached periphyton. The water is pumped at a rate of 10 cm/s. When the nitrogen and phosphorus levels in the water are reduced to acceptable concentrations of nitrogen and phosphorus, the water is released into a canal that flows into a water supply reservoir.

When the levels of periphyton become unacceptable, the water flow into the trough is terminated and the flow is diverted into another trough system. Then, *Tilapia mossambica* are released from a holding pond into the trough system and allowed to graze on the periphyton. After the filter screens are cleaned, the fish and the sediment from the trough bottom are harvested and analyzed for toxicants. If the toxicant levels are low, the fish can be sold as food and the material from the trough bottom as fertilizer.

EXAMPLE 3

Polluted water with very high concentrations of nitrogen and phosphorus is diverted from a river into a long trough system, 6 m deep. The trough is made of cement and contains a series of filter screens affixed to the side of the trough and spaced at least 25 cm apart. On the sides spaced every 1 m and at a depth of 4 m is a source of artificial sunlight. The artificial sunlight is on for 14 h/day. The trough's filter screens have attached periphyton. The water is pumped at a rate of 1 cm/s. When the nitrogen and phosphorus levels in the water are reduced to acceptable concentrations of nitrogen and phosphorus, the water is released into a river.

One half of the filter screens with the periphyton are replaced every two weeks with clean filter screens. The "dirty" filters screens are added to a pool stocked with *Campostoma anomalum.* The fish graze and clean the screens.

EXAMPLES 4

Polluted water with very high concentrations of nitrogen and phosphorus is diverted from a river into a long trough system, 2 m deep. The trough contains a series of filter screens with attached periphyton. The water is pumped at a rate of at least 1 cm/s. When the nitrogen and phosphorus levels in the water are reduced to acceptable concentrations of nitrogen and phosphorus, the water is released into a water supply reservoir.

If the water is unacceptable after incubation with the periphyton, the filter screens are removed and replaced with clean filter screens. The removed screens are taken to a pond stocked with *Tilapia mossambica*, where the fish graze and clean the screens. After the screens are cleaned, the fish and pond sediment are harvested and analyzed for toxicants.

EXAMPLE 5

Raw sewage flows into a holding pool. The solids are allowed to settle and the sewage water is pumped into a long trough system for treatment. The treatment in the long trough system is as described in Example 4.

EXAMPLE 6

After heavy rains, the amount of water entering the waste treatment plant reaches plant capacity and threatens to flood the plant. Rather than releasing the raw sewage water into a channel to avoid flooding, the water is released into a deep tunnel system. This system is equipped with sources of artificial sunlight at regular intervals both above the water and on the sides. Filter screens attach to the sides in a series. Periphyton is seeded onto the filter screens. The water circulates through the tunnel system where the periphyton treat it as described in Example 4.

The invention creates a water treatment method founded upon sound ecological principles. The invention uses nature to remove manmade pollution. This has many advantages.

One advantage is that the method is a relatively simple way to treat water. The system harnesses water current to maintain air levels and mix nutrients and wastes. The invention does not need aerators or circulators, however, aerators and circulators may be used if desired.

The invention provides a simple method to remove undesirable chemicals from the water. The periphyton remove the undesirable chemicals from the water, while the fish convert the periphyton into forms, like fish tissue or feces, easily removable from the waterway.

The invention provides an easy method to monitor toxicant levels. Since toxicant concentrations in the water are frequently too low to measure adequately, the method uses the fish and their feces to measure the amount of toxicants in the water.

The invention creates a source of revenue. The fish are a food source. The fish can be regularly harvested to sell or to feed to people or other fish, such as piscivorous gamefish. Bottom sediment containing fish feces and other nutrients can be recovered and used as an inexpensive fertilizer.

While the invention is shown in only some of its forms, it is not thus limited and is susceptible to various changes and modifications without limiting the invention's spirit.

What is claimed is:

1. A method of treating flowing water in a waterway to reduce the quantity of undesirable chemicals in the water using periphyton and fish, the method comprising: maintaining the flowing water in the waterway at a minimum flow rate of about 1 to about 10 cm/s;
exposing the flowing water to periphyton;
treating the flowing water by allowing the uptake of undesirable chemicals by the periphyton for reducing the quantity of undesirable chemicals; and
controlling periphyton growth and converting undesirable chemicals to forms removable form the flowing water with fish.

2. A method of treating flowing water in a waterway to reduce the quantity of undesirable chemicals in the water using periphyton and fish, the method comprising:
transferring water from the water's source to a secondary waterway;
treating the transferred flowing water by allowing the uptake of undesirable chemicals by the periphyton for reducing the quantity of undesirable chemicals; and
controlling periphyton growth and converting undesirable chemicals to forms removable from the flowing water with fish.

3. A method of treating flowing water in a waterway to reduce the quantity of undesirable chemicals in the water using periphyton and fish, the method comprising:
transferring water from the water's source to a secondary waterway;
treating the transferred flowing water by exposing the transferred flowing water to a population of periphyton which are at least partially attached to a substrate, and allowing the uptake of undesirable chemicals by the periphyton for reducing the quantity of undesirable chemicals from the flowing water;
controlling periphyton growth and converting undesirable chemicals to forms removable from the flowing water with fish; and
analyzing the fish for undesirable chemicals.

4. The method of claim 3, whereby the waterway is lined with an imperforate material.

5. The method of claim 4, whereby the imperforate material is concrete.

6. The method of claim 4, whereby the imperforate material is metal.

7. The method of claim 4, whereby the imperforate material is fiberglass.

8. The method of claim 4, whereby the imperforate material is earthen.

9. The method of claim 4, whereby the imperforated material is clay filled.

10. The method of claim 3, whereby the waterway is treated with artificial sunlight generated by lights spaced at regular intervals in the waterway.

11. The method of claim 3, whereby the flow rate of the transferred water in the secondary waterway is at least 1 cm/s.

12. The method of claim 11, whereby the flow rate is adjusted by gravity.

13. The method of claim 11, whereby the flow rate is adjusted by pumping.

14. The method of claim 11, whereby the flow rate is adjusted by airlifts.

15. The method of claim 3, whereby the substrate is a screen.

16. The method of claim 3, whereby the substrate is a filter.

17. The method of claim 3, whereby the substrate is a net.

18. The method of claim 3, whereby the substrate is a filter screen.

19. The method of claim 3, whereby the fish are algae-grazing.

20. The method of claim 19, whereby the fish are selected from the group consisting of cyprinidae, cichlidae, catostomidae and ictaluridae.

21. The method of claim 20, whereby the fish are selected from tilapia and stonerollers.

22. The method of claim 21, whereby the fish are selected from the group consisting of *Tilapia mossambica, Tilapia aurea,* and *Campostoma anomalum.*

23. The method of claim 3, whereby periphyton growth in the secondary waterway is controlled by fish contained within the secondary waterway grazing on the periphyton.

24. The method of claim 3, whereby periphyton growth is controlled by the fish, the method comprising:
   removing the substrate with the attached periphyton from the secondary waterway;
   transporting the substrate with the attached periphyton to a second location containing a population of fish and placing the substrate in with the fish; and
   allowing the fish to graze on the periphyton attached to the substrate.

25. A method of treating flowing water in a waterway to reduce the quantity of undesirable chemicals in the water using periphyton and fish, the method comprising:
   transferring water from the water's source to a secondary waterway;
   adjusting the rate of flow of the flowing water within the secondary waterway;
   treating the transferred flowing water by exposing the transferred flowing water to a population of periphyton which are at least partially attached to a substrate, and allowing the uptake of undesirable chemicals by the periphyton for reducing the quantity of undesirable chemicals from the flowing water;
   controlling periphyton growth and converting undesirable chemicals to forms removable from the flowing water with fish; and
   analyzing the fish for undesirable chemicals.

26. A method of treating flowing water in a waterway to reduce the quantity of undesirable chemicals in the water using periphyton and fish, the method comprising:
   transferring water from the water's source to a secondary waterway;
   treating the transferred flowing water by exposing the transferred flowing water to a population of periphyton which are at least partially attached to a substrate, and allowing the uptake of undesirable chemicals by the periphyton for reducing the quantity of undesirable chemicals from the flowing water;
   controlling periphyton growth and converting undesirable chemicals to forms removable from the flowing water with fish; and
   analyzing the fish for undesirable chemicals.
   transferring the treated flowing water to a receiving point.

* * * * *